J. DE MARTINO.
HYDRAULIC TRANSMISSION APPARATUS.
APPLICATION FILED JAN. 21, 1913.
1,138,771.
Patented May 11, 1915.
2 SHEETS—SHEET 1.
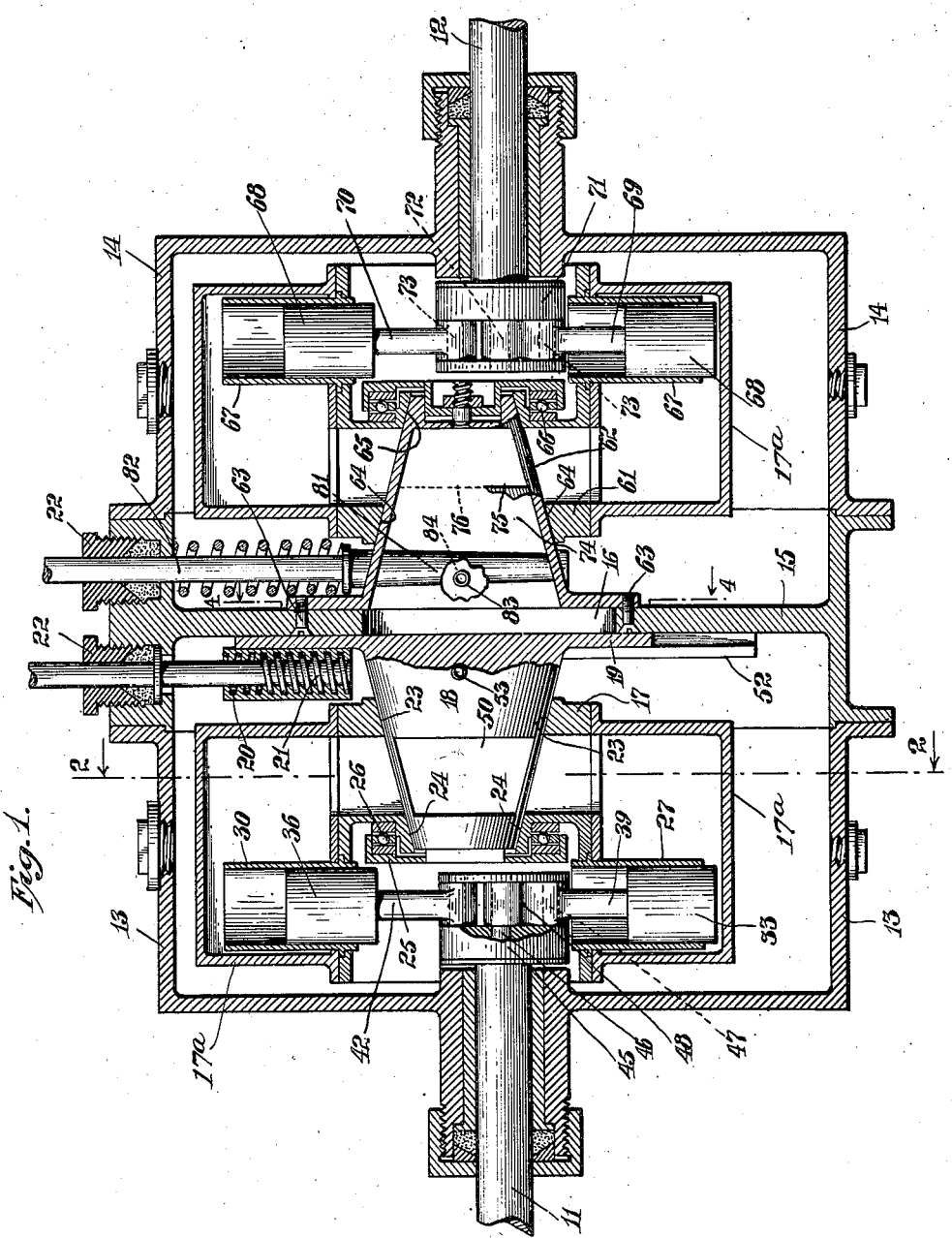
Attest:
Inventor:
Joseph de Martino
by Rogers, Kennedy & Campbell,
Attys.

J. DE MARTINO.
HYDRAULIC TRANSMISSION APPARATUS.
APPLICATION FILED JAN. 21, 1913.
1,138,771.
Patented May 11, 1915.
2 SHEETS—SHEET 2.
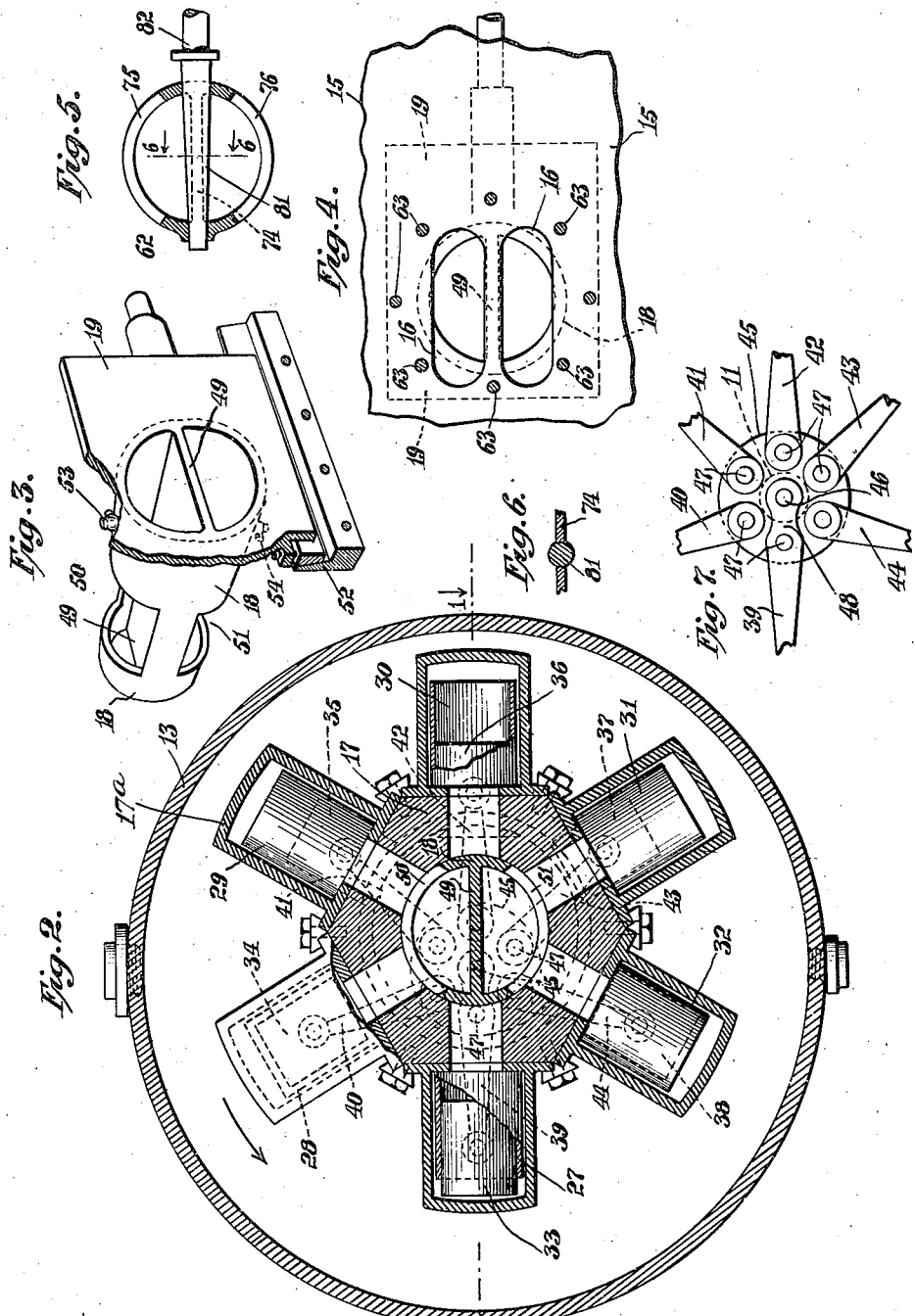
Attest:
Inventor:
Joseph de Martino
by Rogers, Kennedy & Campbell
Attys.

UNITED STATES PATENT OFFICE.

JOSEPH DE MARTINO, OF NEW YORK, N. Y., ASSIGNOR OF ONE-HALF TO CHARLES W. GILLETT, OF NEW YORK, N. Y.

HYDRAULIC TRANSMISSION APPARATUS.

1,138,771.  Specification of Letters Patent.  Patented May 11, 1915.

Application filed January 21, 1913. Serial No. 743,353.

*To all whom it may concern:*

Be it known that I, JOSEPH DE MARTINO, a subject of the King of Italy, residing at New York city, in the county of New York and State of New York, have invented certain new and useful Improvements in Hydraulic Transmission Apparatus, of which the following is a specification, reference being had therein to the accompanying drawing.

My invention relates to hydraulic transmission apparatus and more particularly to an apparatus operating on hydraulic principles by which power from a driving shaft is communicated to a driven shaft, preferably in a manner which enables the relative speeds to be varied or controlled at will.

Generally speaking, such an apparatus may be said to involve a substantially closed circuit of liquid which is pumped around the circuit through a force exerted through the driving shaft at one point, and which at another point effects the rotation of the driven shaft or shafts.

The objects of the present improvement are principally to render practical and operative such an apparatus where heretofore they have not been practically available, and to afford a hydraulic transmission combining simplicity, efficiency, smooth operation, absence of leakage and durability, and minimum friction.

I will first describe an apparatus embodying the present improvement and will thereafter set forth the novel features in the appended claims.

In the accompanying drawings forming a part hereof, Figure 1 is a horizontal cross section taken centrally and longitudinally of the driving shaft. Fig. 2 is a transverse cross section taken on the plane indicated by the line 2—2 on Fig. 1. Fig. 3 is a partial view in perspective showing the construction of the adjustable cone at the driven end which affords a bearing and a valve or ports. Fig. 4 is a section taken on the plane represented by the line 4—4 of Fig. 1. Fig. 5 is a sectional view of the cone at the driven end of the apparatus. Fig. 6 is a cross section taken on the plane represented by line 6—6 on Fig. 5. Fig. 7 is a view showing the arrangement of the hub and piston rods at each end of the apparatus.

Similar numerals of reference designate corresponding parts in the several figures of the drawing.

The present invention consists in the herein illustrated and described novel features of construction, arrangement, combination, and principles of operation, and in some respects the details thereof, although the details may be varied indefinitely without departing from the main principles of the improvement, so that I do not wish to be restricted thereto, excepting as set forth in the appended claims.

In a general way, the illustrated apparatus embodying my invention comprises the three following features. There is first a group of pulsators adapted to drive the liquid through its circuit said pulsators being actuated from a driving shaft 11, such as an engine shaft. Secondly there will be at least one driven group of pulsators working in coöperation by the flow of the transmitting liquid so as to cause rotation of a driven shaft 12, which may for example be the rear shaft of a vehicle. Thirdly there will be the communications or passages affording a closed liquid circuit so that the liquid may pass from the driving group of pulsators to the driven group and therefrom back again to the driving group.

Before describing the operating mechanism I refer to the provision of an outer casing consisting of the part 13 at the driving end and the part 14 at the driven end, each having plugs for filling and draining the casing, so that the casing may be maintained full of lubricating oil, not only for smooth running but also in order that any leakage or deficiency of oil from the interior working parts may be readily supplied through proper valves. Between the casing portions 13 and 14 is a central partition 15 and in this is formed a double aperture 16 one portion of which serves for the outgoing current, and the other for the current of liquid returning to the driving group of pulsators. Any desired transmitting and lubricating fluid may be employed, and I prefer for this purpose an oil of sufficient fluidity to prevent excessive friction.

I will now first refer to the driving end of the apparatus, and afterwards explain the driven end. Within the casing 13 is contained a revoluble hollow inner casing which may be termed a drum 17 having conduit caps 17ª, whose details and shape are unimportant, its function being to support and carry the driving group of pulsators and to afford the proper passages to enable the discharged liquid to pass outwardly to the driven end of the apparatus and to enable the returning liquid to be distributed by suction to a part of the pulsators.

According to one important feature hereof, the group of pulsators (cylinders having discharge and suction) and the drum 17 with which they are formed, have their support independently of the shaft 11, the support being afforded by the member 18 which is normally stationary. Specifically this member 18 is of a hollow construction and affords not only a supporting bearing for the cylinder group, but also a stationary valve for properly directing the outflow from and inflow to the several cylinders as they revolve. I prefer that the hollow member 18, constituting a bearing and a valve, shall be in conical form as shown, with lateral ports in its upper and lower sides and a central partition dividing it into outgoing and incoming passages, corresponding in position with the two portions of the double aperture 16 in the separating partition 15 between the driving and driven ends of the apparatus.

In connection with these features, I have provided a lantern or six studded hub secured on the driving shaft 11, and serving as a driving connection to the pulsators. By such arrangement the quantity or speed of liquid flow through the apparatus may be governed by bodily shifting the revolving group of pulsators, and for this purpose I have provided the conical member 18 with a sliding base plate 19, arranged vertically in face contact with the separating partition 15. In order to shift the member 18 to vary the eccentricity as between the shaft 11 and the pulsator group, I have provided the base plate 19 with a screw threaded enlargement 20 which is engaged by a screw threaded rod 21, which passes through a stuffing box 22 to the exterior of the apparatus where it may be suitably operated for causing the shifting of the member 18 and the pulsator group carried by it.

I prefer that the drum 17 have a bearing contact with the cone 18 at two separated points on the surface of the latter, namely at the point 23 and at the point 24, where there may be either simple surface contact as shown or a suitable ball bearing arrangement which would preclude leakage of fluid. At the smaller extremity of the cone 18 is shown a detachable flange 25 having a liquid tight thrust bearing 26, which maintains and insures proper relation between the drum 17 and cone 18. Between the bearing points 23 and 24 are located the interior passages in the drum and also the ports in the cone, so that as the drum revolves about the cone there will be effective coöperation.

Six pulsators or cylinders with pistons are shown, designated 27 to 32 respectively, arranged in rotation around the drum 17. Within the cylinder 27 is a piston 33, and likewise the remaining cylinders are provided with pistons, 34 to 38 respectively. For the operation of the piston 33 is shown the connecting rod 39, likewise the remaining pistons are provided with connecting rods 40 to 44 respectively.

At the inner end of the driving shaft 11 is the lantern or six pointed hub 45 before referred to, having a central stud 46 and the six circumferential pins 47. The six connecting rods 39 to 44 extend respectively to the six circumferential pins of the lantern 45.

While the drum 17 has its support and bearing on the cone 18, it is, of course, driven by the driving shaft 11, and for this purpose one of the connecting rods 39 is extended as shown at 48 in Fig. 7, so as to engage both the pin 47 and the central stud 46. This may be considered as a master rod and obviously it causes the cylinder group to revolve in unison with, although sometimes eccentrically to, the shaft 11. With this arrangement, manifestly as each cylinder reaches the position of cylinder 30 as shown in Fig. 1, its piston is drawn inwardly as shown and when it passes therefrom to the opposite position it is forced outwardly through the eccentric operation of its connecting rod to the position shown by piston 33 in cylinder 27 in Fig. 1. All of the cylinders during the upper half of their revolution discharge liquid and during the lower half admit liquid from the connecting passages. In the drum 17 each cylinder has its connecting passage extending to the cone member 18. The result is that all of the cylinders in the upper half of their revolution discharge liquid into the upper opening or outlet port 50 of the cone member, and during the remainder of their travel the cylinders suck liquid from the underneath or inlet port 51 in the cone member.

As already explained, the upper and lower interior portions of the cone are divided, and for this purpose a horizontal partition 49 is shown which registers with the corresponding partition in the fixed dividing plate 15.

In order to keep the sliding base plate 19 in proper contact with the dividing partition 15, the former may be provided with guides 52 having any convenient form of adjusting device for taking up wear.

With the above described device it is obvious that the rotation of the driving shaft causes the rotation of the lantern or hub 45 and the drum 17 containing the six cylinders. If set eccentrically as shown, the pistons work in and out so that half of them are discharging and the other half sucking. There is consequently a continuous flow of liquid out of the driving end of the apparatus and a corresponding inflow from the driven end. Since the amount and rate of discharge and inflow will vary according to the stroke of the pistons, it is obvious that the adjustment of the cone member 18 toward or from a concentric position will vary the hydraulic flow. Thus for example, referring to Fig. 1, if the cone member 18 and the cylinder group carried by it be adjusted in a direction away from the stuffing box 22, (see Fig. 1,) so that the axis of the cone comes into line with the driving shaft 11, the rotary parts will then be concentric and the piston stroke reduced to nothing, so that there will be no liquid flow and no hydraulic transmission of power. Intermediate positions permit an infinite degree of speed control and an adjustment to the other side of the central position would obviously reverse the action of each cylinder so as to cause a reverse flow of liquid. As will below appear, these reversals or adjustments of liquid flow cause corresponding reversals or adjustments of speed of the driven shaft 12 at the other end of the apparatus.

Obviously the above particularly described driving mechanism might be employed to operate a driven mechanism of various constructions, but it is more particularly adapted to a driven mechanism which, as shown, has a structure which is complementary to the driving mechanism, and the two are in fact adapted to be combined in close juxtaposition in substantially a single casing as shown. It may also be said that the driven mechanism shown would in some cases be operable with a different driving mechanism. Therefore, I desire to claim the novel features disclosed whether applied to the driving mechanism or the driven mechanism or both.

In its main respects, the driven mechanism is the complement of the driving mechanism, thus the former has a drum 61 carrying a group of cylinder and piston pulsators, and this drum is supported on the cone 62 which serves both as a bearing for the drum and as a stationary valve. At the driven end, however, preferably the cone 62 is secured by screws 63 against shifting or adjustment. Adjustment of eccentricity at one side only of the apparatus is sufficient, although it might be in some cases effected at both sides. The drum 61 bears against the cone 62 at the outer bearing point 64 and the inner bearing point 65 and a thrust bearing 66 is provided as before. On the drum 61 are six cylinders 67, each containing piston 68, one of which has the master connecting rod 69 by which the drum 61 and shaft 12 revolve in unison. The remaining pistons have the connecting rods 70 and all six connecting rods extend from the pistons to the lantern hub 71 carried on the driven shaft, said hub having stud 72 and the six peripheral pins 73.

The cone bearing 62 has its horizontal central partition 74 forming upper and lower passages and the conical surface is formed with an upper port 75 and a lower port 76.

At any convenient point in the apparatus between the pulsator groups may be provided a cut-out valve such, for example, as the conical valve 81 located for convenience so as to constitute a part of the central partition 74 of the cone 62. This valve may be withdrawn by rod 82 so as to open the partition and thereby afford a short circuit so that the flowing liquid may pass directly back to the driving end without causing operation of the driven mechanism. This device may be used to disconnect the power in an emergency.

The fixed relation between the pulsator group carried on drum 61 and the driven shaft 12 gives the cylinders 67 and pistons 68 a fixed action or stroke. therefore as the direction or extent of liquid flow produced in the driving mechanism may be changed, the direction or speed of rotation of the driven shaft will correspondingly change.

It will thus be seen that I have described an apparatus accomplishing the objects and advantages hereinbefore recited, and other advantages will be apparent to those skilled in the art.

An important provision seen in Figs. 1 and 3 is a pair of check valves 53, 54, for example of the ball type, each adapted to admit liquid to the circuit and to prevent outflow. For convenience these are placed at the upper and lower sides of the cone 18, one serving during the forward operation of the mechanism and the other during the reverse, to admit any necessary small quantities of liquid to make up any deficiency thereby preventing the occurrence of a vacuum and the hammering action that would result.

What I claim and desire to secure by Letters Patent is:

1. A hydraulic transmission apparatus including in combination a driven mechanism operated by liquid flow, and a driving mechanism, the latter comprising a revoluble pulsator-group and drum supported on a non-revoluble bearing, and a hub device actuated by the driving shaft for operating said pulsators by eccentricity to cause continuous liquid flow to and from the driven mechanism in closed circuit.

2. A hydraulic transmission apparatus including in combination a driven mechanism operated by liquid flow, and a driving mechanism, the latter comprising a revoluble pulsator-group supported on a non-revoluble bearing, and a device actuated by the driving shaft for operating said pulsators; and means for bodily shifting the position of the pulsator group to vary or reverse the liquid flow.

3. A hydraulic transmission apparatus including in combination a driven mechanism operated by liquid flow, and a driving mechanism, the latter comprising a pulsator-group, a revoluble drum carrying said pulsator group, a non-revoluble bearing supporting said drum, a device actuated by the driving shaft for operating said pulsators, and means for directing the discharge and suction of the pulsators to maintain a continuous flow; and means for shifting said drum to vary or reverse the liquid flow.

4. A hydraulic transmission apparatus including in combination a driven mechanism operated by liquid flow, and a driving mechanism, the latter comprising a pulsator-group, a revoluble drum carrying said pulsator-group, a non-revoluble bearing supporting said drum, and a device actuated by the driving shaft for operating said pulsators; said bearing having ports for directing the discharge and suction to maintain a continuous flow; and means for shifting said bearing with the drum and pulsator-group to vary or reverse the liquid flow.

5. A hydraulic transmission apparatus comprising in combination with a driven mechanism operated by liquid fluid and having a revoluble pulsator-group, a fluid-tight non-revoluble bearing supporting said pulsator-group, a liquid controlling driving mechanism comprising a revoluble pulsator-group, a fluid-tight non-revoluble bearing supporting said last named pulsator-group, a device actuated by the driving shaft for operating said last named pulsators, and means for bodily shifting the position of said last named pulsator-group to vary or reverse the liquid flow.

6. Hydraulic apparatus for transmission of power between two shafts including in combination a driven mechanism operated by liquid flow, passages affording a closed liquid circuit between the driven and driving mechanisms, and a driving mechanism for causing liquid flow, at least one of said mechanisms comprising a revoluble drum, a pulsator-group carried by said drum, a device in operative connection with one of the shafts for controlling said pulsators by eccentricity, and a stationary hollow member affording a bearing support for said drum and provided with outlet and inlet ports for directing the discharge and admission of the pulsators.

7. Hydraulic apparatus for transmission of power between two shafts including in combination a driven mechanism operated by liquid flow, passages affording a closed liquid circuit between the driven and driving mechanisms, and a driving mechanism for causing liquid flow, at least one of said mechanisms comprising a revoluble drum, a pulsator-group carried by said drum, a device in operative connection with one of the shafts for controlling said pulsators by eccentricity, and a stationary hollow member affording a bearing support for said drum and provided with outlet and inlet ports for directing the discharge and admission of the pulsators; together with means for shifting said hollow member to vary the eccentricity between said pulsator-group and shaft.

8. Hydraulic apparatus for transmission of power between two shafts including in combination a driven mechanism operated by liquid flow, passages affording a closed liquid circuit between the driven and driving mechanisms, and a driving mechanism for causing liquid flow about such circuit, at least one of said mechanisms comprising a revoluble drum, a pulsator-group carried by said drum, a device in operating connection with one of the shafts for controlling said pulsators by eccentricity, and a hollow conical member affording a bearing support for said drum and provided with outlet and inlet ports for directing the discharge and admission of the pulsators.

9. Hydraulic apparatus for transmission of power between two shafts including in combination a driven mechanism operated by liquid flow, passages affording a closed liquid circuit between the driven and driving mechanisms, and a driving mechanism for causing liquid flow about such circuit, at least one of said mechanisms comprising a revoluble drum, a pulsator-group carried by said drum, a device in operating connection with one of the shafts for controlling said pulsators by eccentricity, and a hollow conical member affording a bearing support for said drum and provided with outlet and inlet ports for directing the discharge and admission of the pulsators, and an internal partition for affording outlet and inlet passages.

10. Hydraulic apparatus for transmission of power between two shafts including in combination a driven mechanism operated by liquid flow, passages affording a closed liquid circuit between the driven and driving mechanisms, and a driving mechanism for causing liquid flow about such circuit, at least one of said mechanisms comprising a revoluble drum, a pulsator-group carried by said drum, a device in operating connection with one of the shafts for controlling said pulsators by eccentricity, and a hollow conical member affording a bearing support for said drum and provided with outlet and inlet ports for directing the discharge and admission of the pulsators having two separated bearing points for said drum on its conical surface, and a thrust bearing between cone and drum, and having outlet and inlet ports located between said separated bearing points.

11. Hydraulic apparatus for transmission of power between two shafts including in combination a driven mechanism operated by liquid flow, passages affording a closed liquid circuit between the driven and driving mechanisms, and a driving mechanism for causing liquid flow about such circuit, at least one of said mechanisms comprising a revoluble drum, a pulsator-group carried by said drum, a device in operating connection with one of the shafts for controlling said pulsators by eccentricity, and a hollow conical member affording a bearing support for said drum and provided with outlet and inlet ports for directing the discharge and admission of the pulsators; and adjusting means for shifting said cone without closing said passages and so as to change the eccentricity between said pulsator-group and shaft.

12. Hydraulic apparatus for transmission of power between two shafts including in combination a driven mechanism operated by liquid flow, passages affording a closed liquid circuit between the driven and driving mechanisms, and a driving mechanism for causing liquid flow about such circuit, at least one of said mechanisms comprising a revoluble drum, a pulsator-group carried by said drum, a hub device in operating connection with one of the shafts for both causing the revolutions of said drum, and controlling said pulsators by eccentricity, and a hollow conical member affording a bearing support for said drum and provided with outlet and inlet ports for directing the discharge and admission of the pulsators.

13. A hydraulic transmission apparatus including in combination a driven mechanism, a driven shaft, a closed liquid circuit between the driven and driving mechanisms, a driving mechanism, a driving shaft, one of said mechanisms comprising a revoluble pulsator-group and, as a connection between the shaft and pulsators a lantern hub on the shaft a series of connecting rods from the pins thereof to the pulsators, and means for locking one of said rods to the hub for causing the revolution of the actuator group.

14. Hydraulic apparatus for transmission of power between two shafts including in combination a driven mechanism operated by liquid flow, passages affording a closed liquid circuit between the driven and driving mechanisms, and a driving mechanism for causing liquid flow about such circuit, at least one of said mechanisms comprising a revoluble drum, a pulsator-group carried by said drum, a device in operating connection with one of the shafts for controlling said pulsators by eccentricity, and a hollow conical member affording a bearing support for said drum and provided with outlet and inlet ports for directing the discharge and admission of the pulsators; and one or more inlet check valves for admitting liquid to the circuit.

15. Hydraulic apparatus for transmission of power between two shafts including in combination a driven mechanism operated by liquid flow, passages affording a closed liquid circuit between the driven and driving mechanisms, and a driving mechanism for causing liquid flow about such circuit, at least one of said mechanisms comprising a revoluble drum, a pulsator-group carried by said drum, a device in operating connection with one of the shafts for controlling said pulsators by eccentricity, and a hollow conical member affording a bearing support for said drum and provided with outlet and inlet ports for directing the discharge and admission of the pulsators; and said apparatus containing a cut out valve for opening a liquid short circuit intermediate of said pulsator-group and the other of said mechanisms.

In testimony whereof I affix my signature in presence of two witnesses.

JOSEPH DE MARTINO.

Witnesses:
DONALD CAMPBELL,
WM. J. DOLAN.